US012272075B2

United States Patent
Yasui

(10) Patent No.: US 12,272,075 B2
(45) Date of Patent: Apr. 8, 2025

(54) INFORMATION PROCESSING APPARATUS, INFORMATION PROCESSING METHOD, AND STORAGE MEDIUM FOR ESTIMATING MOVEMENT AMOUNT OF MOVING OBJECT

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 377 days.

(21) Appl. No.: 17/689,066

(22) Filed: Mar. 8, 2022

(65) Prior Publication Data

US 2022/0301185 A1    Sep. 22, 2022

(30) Foreign Application Priority Data

Mar. 16, 2021   (JP) ................... 2021-042711

(51) Int. Cl.
*G06T 7/207* (2017.01)
*B60W 40/105* (2012.01)
(Continued)

(52) U.S. Cl.
CPC ........... *G06T 7/207* (2017.01); *B60W 40/105* (2013.01); *B60W 50/14* (2013.01); *G06T 3/40* (2013.01);
(Continued)

(58) Field of Classification Search
CPC .......... G06T 7/223; G06T 7/248; G06T 7/254
See application file for complete search history.

(56) References Cited

U.S. PATENT DOCUMENTS 4,639,767 A * 1/1987 Suzuki ................... H04N 5/144
                                                    348/669
5,134,472 A * 7/1992 Abe ....................... H04N 7/188
                                                    348/700
(Continued)

FOREIGN PATENT DOCUMENTS

CN    102722982 A    10/2012
CN    104002730 A    8/2014
(Continued)

OTHER PUBLICATIONS

C. Yang, H. Hongo and S. Tanimoto, "A New Approach for In-Vehicle Camera Obstacle Detection by Ground Movement Compensation," 2008 11th International IEEE Conference on Intelligent Transportation Systems, Beijing, China, 2008, pp. 151-156, doi: 10.1109/ITSC.2008.4732533. (Year: 2008).*

(Continued)

*Primary Examiner* — Michael Robert Cammarata
(74) *Attorney, Agent, or Firm* — Thomas | Horstemeyer, LLP

(57) ABSTRACT

An information processing apparatus, for estimating a movement amount of a moving object to which the information processing apparatus is attached, captures an image taken of an exterior view seen from the moving object. The apparatus estimates the movement amount of the moving object based on a first taken image taken at a first time and a second taken image taken at a second time earlier than the first time. The apparatus estimates the movement amount of the moving object based on a difference between image information on a predetermined region of each manipulated image obtained by manipulating the second taken image based on mutually different predicted movement amounts and image information on a predetermined region cut out from the first taken image.

13 Claims, 7 Drawing Sheets

(51) Int. Cl.
*B60W 50/14* (2020.01)
*G06T 3/40* (2024.01)
*G06V 10/25* (2022.01)
*G06V 20/58* (2022.01)

(52) U.S. Cl.
CPC .............. *G06V 10/25* (2022.01); *G06V 20/58* (2022.01); *B60W 2050/143* (2013.01); *B60W 2050/146* (2013.01); *B60W 2420/403* (2013.01); *G06T 2207/30252* (2013.01)

(56) References Cited

U.S. PATENT DOCUMENTS

| | | | | |
|---|---|---|---|---|
| 5,654,772 | A * | 8/1997 | Mester | G06T 7/254 348/700 |
| 6,088,394 | A * | 7/2000 | Maltby | G06T 9/004 375/240.12 |
| 7,982,774 | B2 * | 7/2011 | Tsunashima | G06T 7/254 348/208.99 |
| 8,953,674 | B2 * | 2/2015 | Henson | H04N 7/188 375/240.09 |
| 9,070,191 | B2 | 6/2015 | Murashita | |
| 10,422,634 | B2 | 9/2019 | Watanabe et al. | |
| 10,636,126 | B2 | 4/2020 | Kajimura | |
| 10,731,994 | B2 * | 8/2020 | Kato | G06V 20/56 |
| 11,050,929 | B2 | 6/2021 | Okada | |
| 2002/0051058 | A1 * | 5/2002 | Ito | G06T 7/254 348/155 |
| 2003/0194110 | A1 * | 10/2003 | Brodsky | G06T 7/254 382/103 |
| 2008/0247628 | A1 * | 10/2008 | Ramsing | C12M 41/48 382/133 |
| 2012/0213412 | A1 | 8/2012 | Murashita | |
| 2017/0345161 | A1 * | 11/2017 | Takatani | G06T 7/246 |
| 2018/0180409 | A1 | 6/2018 | Watanabe et al. | |
| 2019/0066312 | A1 * | 2/2019 | Kaneko | G06T 7/248 |
| 2019/0283746 | A1 * | 9/2019 | Shalev-Shwartz | B60W 30/09 |
| 2020/0412944 | A1 | 12/2020 | Okada | |
| 2021/0099646 | A1 * | 4/2021 | Jia | G06T 7/11 |
| 2023/0202473 | A1 * | 6/2023 | Shalev-Shwartz | B60W 30/143 701/93 |

FOREIGN PATENT DOCUMENTS

| | | | | |
|---|---|---|---|---|
| CN | 108141509 | A | 6/2018 | |
| CN | 108335507 | A | 7/2018 | |
| CN | 111699680 | A | 9/2020 | |
| DE | 10334136 | B4 * | 7/2010 | ............... G06T 5/50 |
| JP | H0797408 | B2 * | 10/1995 | |
| JP | 2003-173435 | A | 6/2003 | |
| JP | 3868268 | B2 * | 1/2007 | |
| JP | 2010-002985 | A | 1/2010 | |
| JP | 2011-141221 | A | 7/2011 | |
| JP | 2011-150573 | A | 8/2011 | |
| JP | 2012-173874 | A | 9/2012 | |
| JP | 2013-002884 | A | 1/2013 | |
| JP | 2017-020942 | A | 1/2017 | |
| WO | WO-2016075954 | A1 * | 5/2016 | ............... B60R 1/00 |

OTHER PUBLICATIONS

J.-x. Wang, "Research of vehicle speed detection algorithm in video surveillance," 2016 International Conference on Audio, Language and Image Processing (ICALIP), Shanghai, China, 2016, pp. 349-352, doi: 10.1109/ICALIP.2016.7846573. (Year: 2016).*

N. Chaiyawatana, B. Uyyanonvara, T. Kondo, P. Dubey and Y. Hatori, "Robust object detection on video surveillance," 2011 Eighth International Joint Conference on Computer Science and Software Engineering (JCSSE), Nakhonpathom, Thailand, 2011, pp. 149-153, doi: 10.1109/JCSSE.2011.5930111. (Year: 2011).*

Z. Liu, C. Yu and B. Zheng, "Any type of obstacle detection in complex environments based on monocular vision," Proceedings of the 32nd Chinese Control Conference, Xi'an, China, 2013, pp. 7692-7697. (Year: 2013).*

Abiel Aguilar-González, Miguel Arias-Estrada, François Berry, J.A. de Jesús Osuna-Coutiño, The fastest visual ego-motion algorithm in the west, Microprocessors and Microsystems, vol. 67, 2019, pp. 103-116, ISSN 0141-9331, https://doi.org/10.1016/j.micpro.2019.03.005. (Year: 2019).*

Japanese Office Action for Japanese Patent Application No. 2021042711 mailed May 17, 2024 (partially translated).

Chinese Office Action for Chinese Application No. 202210210219.9 mailed Aug. 31, 2024.

Chinese Office Action for Chinese Application No. 202210210219.9 mailed Feb. 5, 2025.

* cited by examiner

FIG. 1
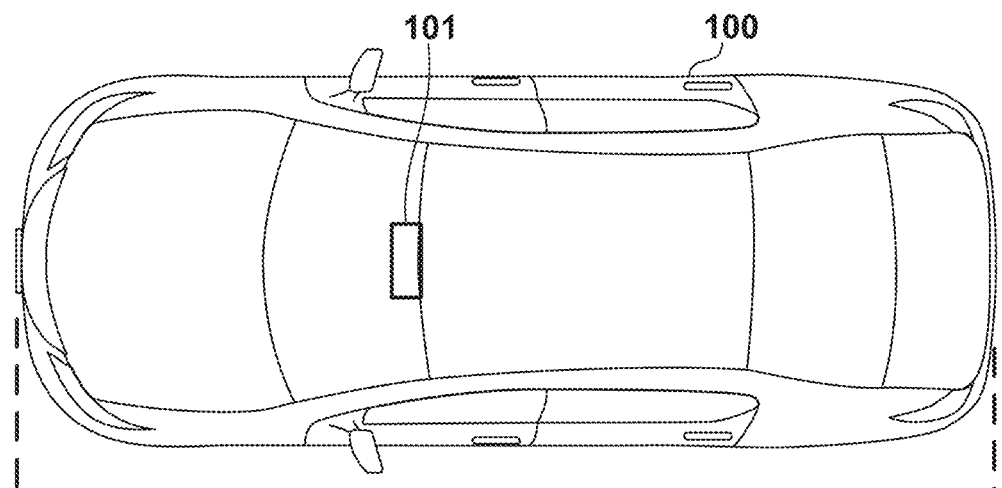
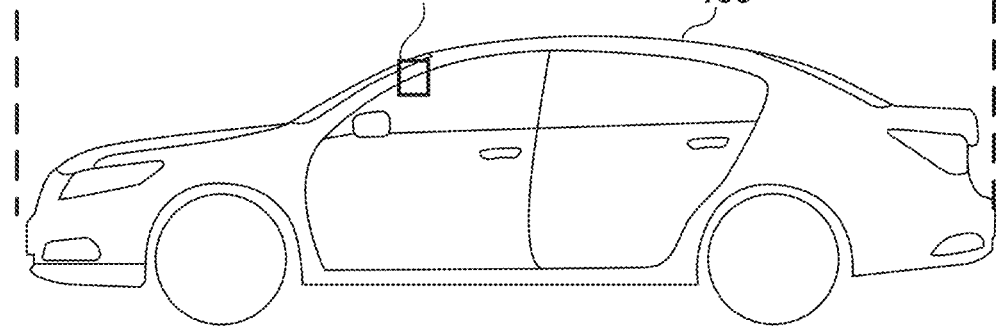
FIG. 2
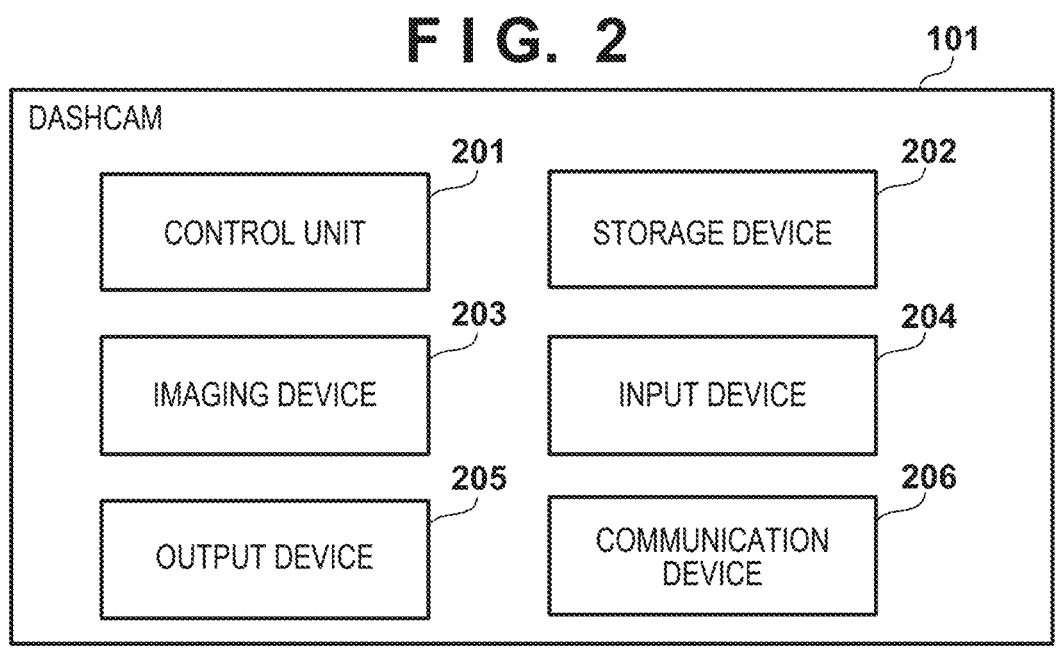

INFORMATION PROCESSING APPARATUS, INFORMATION PROCESSING METHOD, AND STORAGE MEDIUM FOR ESTIMATING MOVEMENT AMOUNT OF MOVING OBJECT

CROSS-REFERENCE TO RELATED APPLICATION(S)

This application claims priority to and the benefit of Japanese Patent Application No. 2021-042711 filed on Mar. 16, 2021, the entire disclosure of which is incorporated herein by reference.

BACKGROUND OF THE INVENTION

Field of the Invention

The present invention relates to an information processing apparatus, an information processing method, and a storage medium for estimating a movement amount of a moving object.

Description of the Related Art

A dashcam that is installed in a vehicle (also referred to as a moving object) and takes an image of a front view or back view seen from the vehicle to record a scene of an accident to the vehicle and a scene immediately before the accident on a recording medium has been widely used. Another type of dashcam capable of not only recording an image capturing a scene of an accident on a recording medium, but also detecting that a vehicle has fallen into a dangerous state although no accident has occurred, such as unsteady driving, and recording an image in response to the detection of the state has been proposed (Japanese Patent Laid-Open No. 2011-150573). As disclosed in Japanese Patent Laid-Open No. 2011-150573, a traveling position of a vehicle is detected based on a position of a white line on a road recognized from information on an image of a front view seen from the vehicle, and unsteady driving is detected based on the position of the vehicle thus detected.

Some dashcams, however, are attached to vehicles after purchase of the vehicles and operate independently without communicating with systems of the vehicles. In order for such a dashcam to provide a driver-assistance function of notifying an occupant of a specific behavior of a vehicle, a technique for estimating a behavior of a vehicle based on information on a taken image is useful.

In order to allow a dashcam to have such a driver-assistance function, a technique for detecting a behavior (for example, a movement amount) of a moving object in a simple and redundant manner without relying on the presence of a specific object (for example, a white line) on a road is desired.

SUMMARY OF THE INVENTION

The present disclosure has been made in consideration of the aforementioned issues, and realizes a technique for enabling a behavior of a moving object to be estimated in a simple and redundant manner.

In order to solve the aforementioned issues, one aspect of the present disclosure provides an information processing apparatus for estimating a movement amount of a moving object to which the information processing apparatus is attached, the information processing apparatus comprising: one or more processors; and a memory storing instructions which, when the instructions are executed by the one or more processors, cause the information processing apparatus to function as: an imaging unit configured to capture a taken image taken of an exterior view seen from the moving object; and an estimation unit configured to estimate the movement amount of the moving object based on a first taken image taken at a first time and a second taken image taken at a second time earlier than the first time, wherein the estimation unit estimates the movement amount of the moving object based on a difference between image information on a predetermined region of each manipulated image obtained by manipulating the second taken image based on mutually different predicted movement amounts and image information on a predetermined region cut out from the first taken image.

Another aspect of the present disclosure provides, an information processing method for estimating a movement amount of a moving object to which an information processing apparatus is attached, the information processing method comprising: capturing a taken image taken of an exterior view seen from the moving object; and estimating the movement amount of the moving object based on a first taken image taken at a first time and a second taken image taken at a second time earlier than the first time, wherein the estimating includes estimating the movement amount of the moving object based on a difference between image information on a predetermined region of each manipulated image obtained by manipulating the second taken image based on mutually different predicted movement amounts and image information on a predetermined region cut out from the first taken image.

Still another aspect of the present disclosure provides, a non-transitory computer-readable storage medium storing a program for causing a computer to function as each unit of an information processing apparatus, the information processing apparatus being an apparatus for estimating a movement amount of a moving object to which the information processing apparatus is attached, the information processing apparatus comprising: an imaging unit configured to capture a taken image taken of an exterior view seen from the moving object; and an estimation unit configured to estimate the movement amount of the moving object based on a first taken image taken at a first time and a second taken image taken at a second time earlier than the first time, wherein the estimation unit estimates the movement amount of the moving object based on a difference between image information on a predetermined region of each manipulated image obtained by manipulating the second taken image based on mutually different predicted movement amounts and image information on a predetermined region cut out from the first taken image.

According to the present invention, it is possible to estimate the behavior of the moving object in a simple and redundant manner.

BRIEF DESCRIPTION OF THE DRAWINGS

FIG. 1 is a diagram schematically illustrating an example of a configuration of a moving object (vehicle) according to a first embodiment of the present invention;

FIG. 2 is a block diagram illustrating an example of a functional configuration of a dashcam serving as an example of an information processing apparatus according to the first embodiment;

DESCRIPTION OF THE EMBODIMENTS

Figure 3:
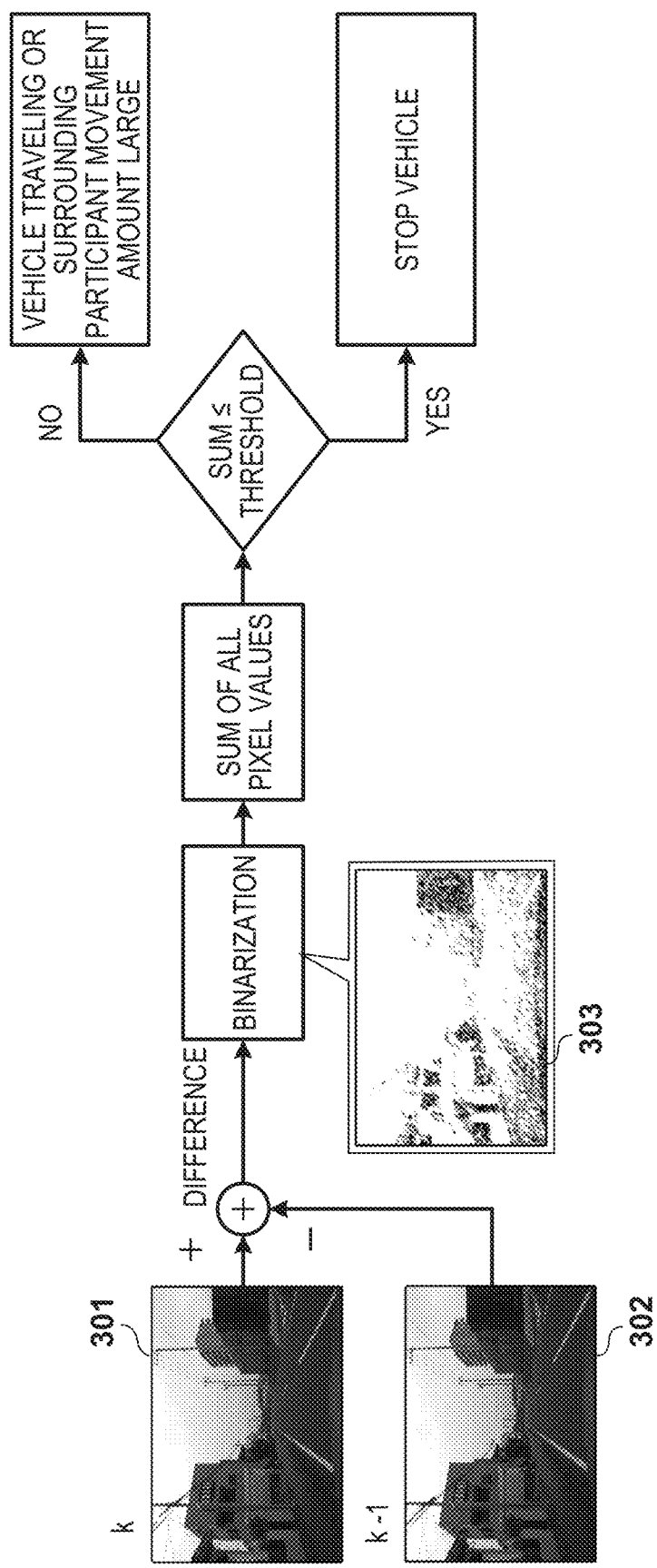
FIG. 3 is a diagram for describing processing of determining a movement amount (stop state) of the moving object (vehicle) according to the first embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

The present embodiment relates to an information processing apparatus for detecting a movement amount of a moving object to which the information processing apparatus is attached. The following embodiment will be described based on an example where the information processing apparatus is, for example, a dashcam attached to a moving object. The information processing apparatus, however, may be a different type of apparatus as long as the information processing apparatus is attached to the moving object and is capable of taking an image of an exterior view seen from the moving object. Further, the following embodiment will be described based on an example where the moving object is, for example, a vehicle. The vehicle is typically a four-wheeled vehicle, but the present embodiment may be applied to other types of vehicles.

An example of a position where the dashcam is attached will be described with reference to FIG. 1. A dashcam 101 is attached to a vehicle 100. The dashcam 101 is attached to a position that does not obstruct the driver's view, the position being either on a windshield of the vehicle 100 near a rear-view mirror or on the rear-view mirror of the vehicle 100. The attachment position of the dashcam 101 is not limited to such a position, and may be any position as long as the image of the exterior view seen from the vehicle 100 can be taken.

Although the dashcam 101 can operate on a stand-alone basis, the dashcam 101 may receive power supplied from the vehicle 100.

<Example of Functional Configuration of Dashcam>

An example of a functional configuration of the dashcam 101 will be described with reference to FIG. 2. The dashcam 101 includes, for example, a control unit 201, a storage device 202, an imaging device 203, an input device 204, an output device 205, and a communication device 206.

The control unit 201 includes, for example, a central processing unit (CPU) and controls the overall operation of the dashcam 101. The control unit 201 may be implemented by, for example, a program stored in the storage device 202 that is loaded and executed by the CPU. The control unit 201 may further include, in addition to the CPU, a graphics processing unit (GPU) and a circuit designed specifically for image processing, machine learning, or the like.

The storage device 202 is a device that stores data and a program related to the operation of the dashcam 101. For example, the storage device 202 may store a program that defines the operation of the dashcam 101, temporary data used during the execution of the program, an image taken by the imaging device 203, an ambient sound picked up by a microphone, and the like. The storage device 202 may be implemented by a memory such as a random access memory (RAM) or a read only memory (ROM). The storage device 202 may further include a secondary storage device such as a solid state drive (SSD).

The imaging device 203 includes a camera configured to take an image of a front exterior view (for example, scenery) seen from the vehicle 100. The imaging device 203 may be, for example, a wide-angle camera. Such a camera is set at the front of the dashcam 101 (at the front of the vehicle 100). The imaging device 203 may further include, in addition to a camera that takes the image of the front view seen from the vehicle 100, cameras capable of taking images of back, left-side, and right-side views seen from the vehicle 100. In this case, the camera that takes the image of the back view may be disposed on a rear side of the dashcam (on a rear side of the vehicle), and the cameras that take the images of the side views may be disposed on sides of the dashcam. Some of the cameras that take the images of views in a plurality of directions may be provided separately from the dashcam. Alternatively, the imaging device 203 may include, for example, a fisheye camera.

The input device 204 is a device configured to receive an instruction from an occupant of the vehicle 100. The input device 204 includes, for example, a button or a touchscreen. The input device 204 may further include a microphone that receives a voice of the occupant or an ambient sound.

The output device 205 is a device configured to output information to the occupant of the vehicle 100. The output device 205 may be a display device (for example, a liquid crystal display or an indicator) that provides visual information or a sound device (for example, a speaker) that provides auditory information, or may include both the display device and the sound device.

The communication device 206 is a device configured to enable the dashcam 101 to communicate with another device (for example, a smartphone owned by a user (not illustrated)). For example, the communication device 206 may transmit an image or a voice stored in the storage device 202 to the smartphone owned by the user. The communication device 206 may communicate with another device by wire or radio. The radio communication may be communication based on a protocol used on, for example, short-range communications (such as Bluetooth (registered trademark)). The communication device 206 may be capable of communicating with a control ECU of the vehicle 100 by wire or radio. The communication device 206 may be optional.

<Outline of Processing of Estimating Movement Amount of Vehicle Performed by Dashcam>

Figure 4:
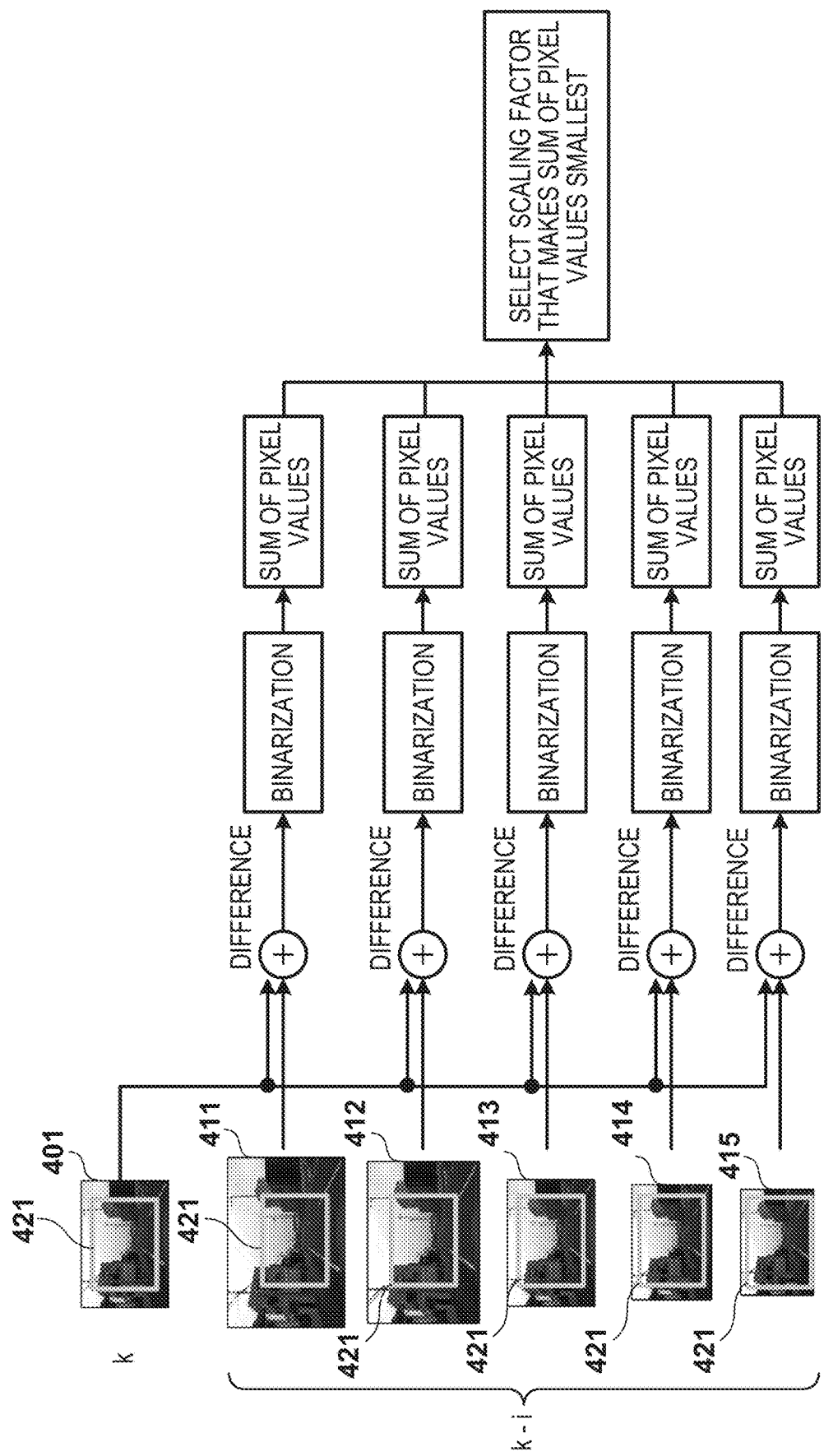
FIG. 4 is a diagram for describing processing of estimating a movement amount (speed level) of the moving object (vehicle) according to the first embodiment.
Figure 5:
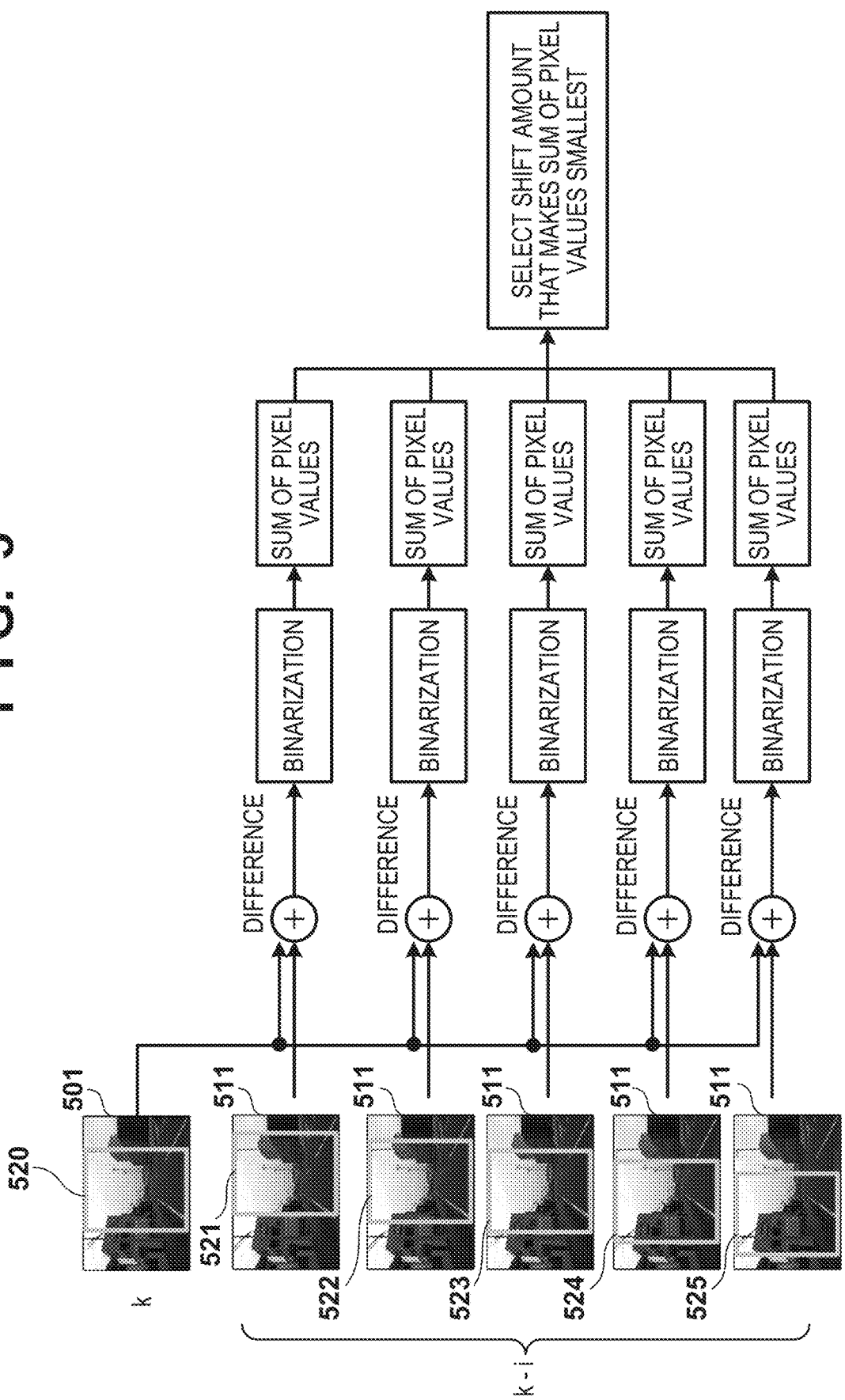
FIG. 5 is a diagram for describing processing of estimating a movement amount (horizontal movement amount) of the moving object (vehicle) according to the first embodiment.

Next, processing of estimating a movement amount of a vehicle to which the dashcam 101 is attached will be described with reference to FIGS. 3 to 5. Note that the description of the processing given with reference to FIGS. 3 to 5 is based on an example where the processing is performed using the taken image, taken by the imaging device 203, of the front view seen from the vehicle 100. The following example is implemented by, for example, a program stored in the storage device 202 that is executed by the control unit 201.

First, processing of determining the movement amount (stop state) of the vehicle will be described with reference to FIG. 3. The dashcam 101 captures a taken image taken by the imaging device 203 at, for example, predetermined time intervals. For example, the control unit 201 captures a taken image 301 taken at a certain time (for example, the current time denoted by k) and a taken image 302 taken at a time earlier than the time k (for example, k−1) and takes a difference between the pixel values of the taken image 301 and the taken image 302 to form a subtraction image.

The control unit 201 converts the subtraction image thus obtained into a binary image 303. The binarization is processing of converting an image into a two-level image, that is, a black and white image, and can make the subtraction image clear by converting the subtraction image into a binary image. A threshold used for the binarization may be preset to an appropriate value by experiments or the like. Note that the present embodiment is described based on an example where the subtraction image is converted into a binary image, but the subtraction image may be subjected to different image processing instead of the binarization. Further, the control unit 201 may perform predetermined image processing such as conversion of each image into an intensity image or edge enhancement before taking a difference.

The control unit 201 calculates the sum of the pixel values of the binary image and determines whether the sum thus calculated is equal to or less than the predetermined threshold. When determining that the calculated sum is equal to or less than the predetermined threshold, the control unit 201 determines that the vehicle is in the stop state. Specifically, at this time, the control unit 201 sets a predetermined vehicle state parameter (for example, Vstate) to "0" indicating the vehicle is in the stop state. On the other hand, when determining that the calculated sum is greater than the predetermined threshold, the control unit 201 determines that the vehicle is traveling or surrounding traffic participants are large in movement amount. Specifically, at this time, the control unit 201 sets the vehicle state parameter (Vstate) to "1" indicating that the vehicle is traveling or traffic participants are large in movement amount.

That is, the control unit 201 takes a difference between the image taken at the time k and the image taken earlier, and determines that, when there are many white pixel values appearing in the subtraction image, a degree of similarity between the two images is high and the vehicle is at a stop. Note that the color indicating a high degree of similarity depends on how the color value of each pixel is determined to be positive or negative and is thus not necessarily white. The present embodiment is described based on an example where the degree of similarity between the images is determined to be high when there are many white pixel values appearing in the subtraction image, but black pixel values may appear in the subtraction image when the degree of similarity is high.

Next, processing of estimating the movement amount (speed level) of the vehicle will be described with reference to FIG. 4. Note that the speed level refers to a movement speed of the vehicle. The speed level, however, may be represented as a degree of speed (for example, high speed, medium speed, or low speed) associated with the movement speed in advance. The dashcam 101 captures a taken image taken by the imaging device 203 at, for example, the predetermined time intervals. For example, the control unit 201 captures a taken image 401 taken at a certain time (for example, k) and a taken image taken at a time (for example, k−1) earlier than the time k. The control unit 201 scales the taken image taken at the time k−1 up or down by a plurality of mutually different scaling factors to form scaled images. For example, the taken image taken at the time k−1 is scaled by stepwise-different scaling factors $\{E_n, E_m, \ldots, 1, \ldots, R_m, R_n\}$ (where $E_n > E_m > \ldots > 1 > \ldots > R_m > R_n > 0$) to form scaled images (for example, scaled images 411 to 415). Then, the control unit 201 cuts out a predetermined region 421 from each of the scaled images 411 to 415 thus formed and the taken image 401. At this time, the predetermined regions thus cut out have the same size and have the same center as the center of the taken images taken at the times k and k−1. The scaling factors $\{E_n, E_m, \ldots, 1, \ldots, R_m, R_n\}$ are each associated with a corresponding speed level at which the vehicle moves forward or backward. This makes an image scaled by a certain scaling factor similar to an image taken at the next timing (that is, time k) when the vehicle travels at the associated speed.

The control unit 201 takes a difference between the pixel values of the predetermined region cut out from the taken image 301 taken at the time k and the pixel values of the predetermined region of each of the scaled images 411 to 415 obtained by scaling the taken image 302 to form a plurality of subtraction images.

The control unit 201 converts each of the plurality of subtraction images thus obtained into a binary image and calculates the sum of the pixel values of the binary image. The control unit 201 selects a scaling factor that makes the sum of the pixel values the smallest among the sums of the pixel values each associated with a corresponding scaling factor. For example, when the taken image taken at the time k−1 is scaled by $E_n$, $E_m$, 1, $R_m$, and $R_n$, and the sum of the pixel values of the scaled image scaled by $E_m$ is the smallest among the scaled images, the control unit 201 selects the scaling factor $E_m$. As described above, since each scaling factor is associated with a corresponding speed level of the vehicle, the speed level associated with the scaling factor $E_m$ is estimated as the speed level (movement amount) of the vehicle 100.

Note that the binarization may be the same as the binarization in the processing described with reference to FIG. 3. The present embodiment is described based on an example where the subtraction image is converted into a binary image, but the subtraction image may be subjected to different image processing instead of the binarization. Further, the control unit 201 may perform predetermined image processing such as conversion of each image into an intensity image or edge enhancement before taking a difference.

Next, processing of estimating the movement amount (horizontal movement amount) of the vehicle will be described with reference to FIG. 5. As described above, the dashcam 101 captures a taken image taken by the imaging device 203 at, for example, the predetermined time intervals. For example, the control unit 201 captures a taken image 501 taken at a certain time (for example, k) and a taken image taken at a time (for example, k−1) earlier than the time k. The control unit 201 cuts out, from the taken image taken at the time k−1, a predetermined region horizontally shifted from the image center by a plurality of mutually different shift amounts. For example, the predetermined regions (for example, predetermined regions 521 to 525)

shifted by stepwise-different shift amounts $\{-S_n, -S_m, \ldots, 0, \ldots, S_m, S_n\}$ (where, $S_n > S_m > \ldots > 0$) are cut out from the taken image taken at the time k−1. The control unit 201 further cuts out a predetermined region 520 from the taken image 501. The shift amounts $\{-S_n, -S_m, \ldots, 0, \ldots, S_m, S_n\}$ are each associated with a corresponding movement amount by which the vehicle moves leftward or rightward. This makes a region cut out by a certain shift amount similar to a predetermined region obtained by cutting out a center part of an image taken when the vehicle moves by the associated movement amount.

The control unit 201 takes a difference between the pixel values of the predetermined region 520 cut out from the taken image 501 taken at the time k and the pixel values of each of the predetermined regions 521 to 525 cut out from the taken image 511 to form a plurality of subtraction images.

The control unit 201 converts each of the plurality of subtraction images thus obtained into a binary image and calculates the sum of the pixel values of the binary image. The control unit 201 selects a shift amount that makes the sum of the pixel values the smallest among the sums of the pixel values each associated with a corresponding shift amount. For example, when the sum of the pixel values of the predetermined region shifted by $S_m$ is the smallest among the predetermined regions shifted by the shift amounts $-S_n, -S_m, 0, S_m, S_n$ of the taken image taken at the time k−1, the control unit 201 selects the shift amount $S_m$. As described above, since each shift amount is associated with a corresponding movement amount of the vehicle, the movement amount associated with the shift amount $S_m$ is estimated as the horizontal movement amount of the vehicle 100.

Note that the binarization may be the same as the binarization in the processing described with reference to FIG. 3. The present embodiment is described based on an example where the subtraction image is converted into a binary image, but the subtraction image may be subjected to different image processing instead of the binarization. Further, the control unit 201 may perform predetermined image processing such as conversion of each image into an intensity image or edge enhancement before taking a difference.

<Series of Operation Steps of Processing of Estimating Movement Amount>

Next, a series of operation steps of processing of estimating the movement amount performed by the dashcam 101 will be described with reference to FIG. 6. Note that this processing is implemented by, for example, a program stored in the storage device 202 that is executed by the control unit 201 of the dashcam 101. This processing may be started at any timing while the vehicle 100 is traveling, and S601 to S608 to be described later may be repeatedly performed.

In S601, the control unit 201 determines a vehicle state. Specifically, the control unit 201 performs the processing of determining the movement amount (stop state) of the vehicle described with reference to FIG. 3. As described above, for example, the control unit 201 captures a taken image taken at a certain time k (which may be the current time) and a taken image taken at a time (for example, k−1) earlier than the time k and takes a difference between the taken images. The control unit 201 calculates the sum of the pixel values of the binary image obtained based on the difference, and determines whether the vehicle is in the stop state or another state (a state where the vehicle is traveling or surrounding traffic participants are large in movement amount) based on the sum thus calculated. When determining that the vehicle is in the stop state, for example, the control unit 201 sets the vehicle state parameter to "0" indicating that the vehicle is in the stop state, otherwise sets the vehicle state parameter to "1".

In S602, the control unit 201 determines whether the vehicle is in the stop state. For example, the control unit 201 determines whether the vehicle state parameter is set to 0 with reference to the value of the vehicle state parameter set in S601. When determining that the vehicle is in the stop state, the control unit 201 brings this series of operation steps to an end. On the other hand, when determining that the vehicle is not in the stop state, the control unit 201 proceeds to S603.

In S603, the control unit 201 estimates the speed level of the vehicle. Specifically, the control unit 201 performs the processing of estimating the movement amount (speed level) of the vehicle described with reference to FIG. 4. As described above, for example, the control unit 201 captures a taken image taken at a certain time k and a taken image taken at a time (for example, k−1) earlier than the time k. The two taken images may be the taken images captured in S601.

The control unit 201 scales the taken image taken at the time k−1 by stepwise-different scaling factors to form a plurality of scaled images and cuts out, from each of the scaled images, a predetermined region having the same center (also referred to as a predetermined region of a scaled image). The control unit 201 further cuts out a predetermined region having the same size from the taken image taken at the time k. The control unit 201 forms a subtraction image based on a difference between the predetermined region cut out from the taken image taken at the time k and each of the predetermined regions cut out from the scaled images and calculates the sum of the pixel values of the binary-converted subtraction image. The control unit 201 identifies a scaling factor that makes the sum of the pixel values the smallest among the sums of the pixel values of the binary-converted subtraction images. As described above, since the scaling factor thus identified is associated with a corresponding speed level when the vehicle moves forward or backward, the control unit 201 can estimate the speed level of the vehicle from the identified scaling factor. For example, the control unit 201 consults a speed level table prestored in the storage device 202 to retrieve the speed level associated with the scaling factor.

In S604, the control unit 201 determines whether the speed level thus obtained is equal to or greater than a predetermined speed threshold. The predetermined speed threshold is, for example, a threshold used for determining whether to perform the processing of estimating the horizontal movement amount of the vehicle. When determining that the speed level of the vehicle is equal to or greater than the predetermined speed threshold, the control unit 201 proceeds to S607 without performing the processing of estimating the horizontal movement amount of the vehicle. On the other hand, when determining that the speed level of the vehicle is less than the predetermined speed threshold, the control unit 201 proceeds to S606 to perform the processing of estimating the horizontal movement amount of the vehicle.

Figure 6:
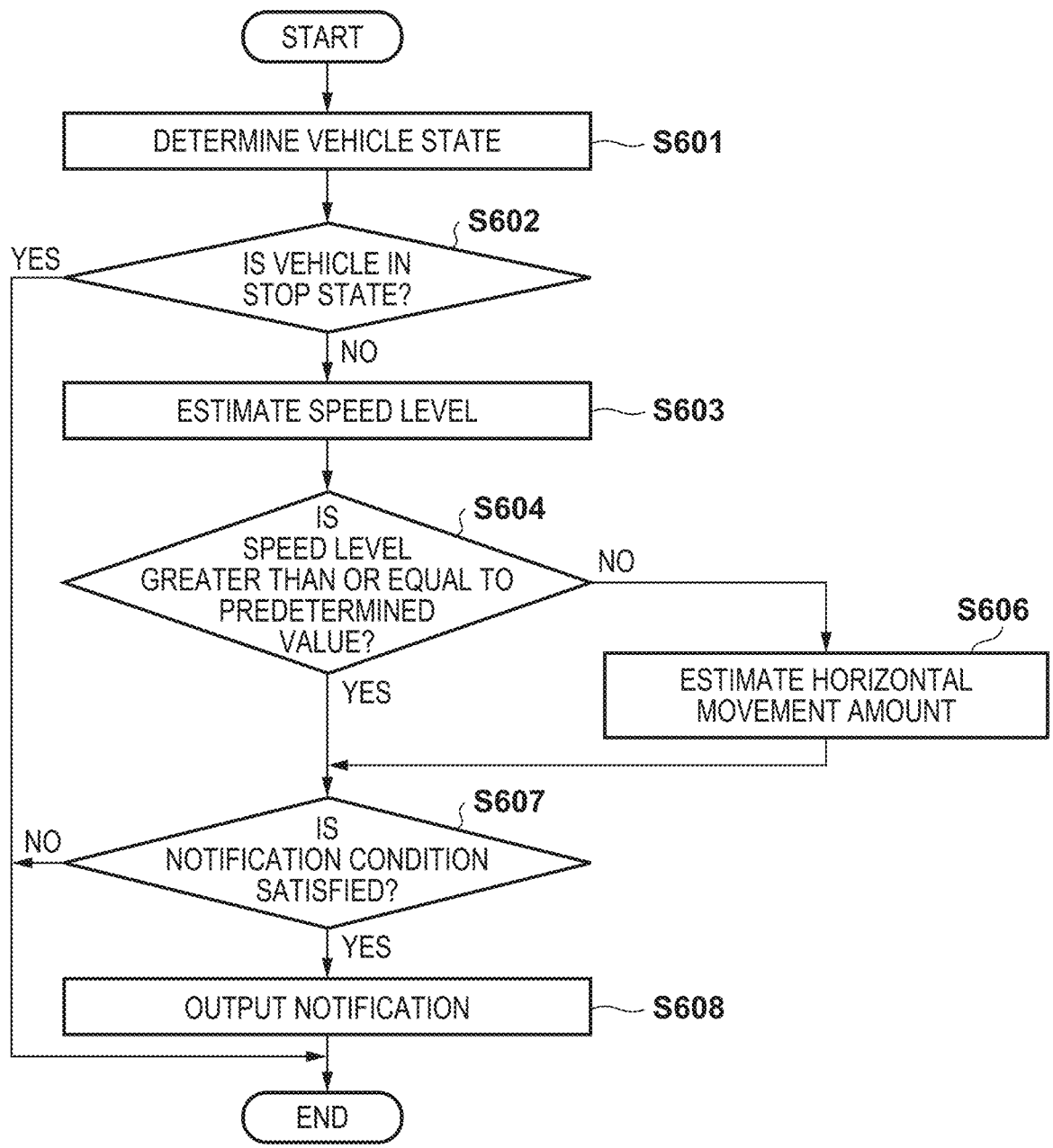
FIG. 6 is a flowchart illustrating a series of operation steps of the processing of estimating a movement amount according to the first embodiment.

Note that, for the processing illustrated in FIG. 6, an example has been described where the processing of estimating the speed level and the processing of estimating the horizontal movement amount are separately defined, and the processing of estimating the horizontal movement amount is performed when the speed level is equal to or less than the predetermined speed threshold. Alternatively, the processing of estimating the speed level and the processing of estimating the horizontal movement amount may be performed at the same time.

For example, the control unit 201 first scales the taken image taken at the time k−1 by stepwise-different scaling factors $\{E_n, E_m, \ldots, 1, \ldots, R_m, R_n\}$ (where $E_n > E_m > \ldots > 1 > \ldots > R_m > R_n > 0$) to form scaled images. Then, the control unit 201 cuts out a predetermined region shifted by the shift amounts $-S_n, -S_m, 0, S_m, S_n$ from each of the scaled images thus formed. The control unit 201 identifies a combination of a scaling factor and a shift amount that makes the pixel values of the difference between the predetermined region cut out from the taken image taken at the time k−1 and the predetermined region of the taken image taken at the time k the smallest. This makes it possible to estimate the movement amount when the vehicle 100 moves in the horizontal direction while moving forward or backward at a certain speed or more.

In S606, the control unit 201 estimates the horizontal movement amount of the vehicle. Specifically, the control unit 201 performs the processing of estimating the movement amount (horizontal movement amount) of the vehicle described with reference to FIG. 5. As described above, for example, the control unit 201 captures a taken image taken at a certain time k and a taken image taken at a time (for example, k−1) earlier than the time k. The two taken images may be the taken images captured in S601.

The control unit 201 cuts out a predetermined region horizontally shifted by stepwise-different shift amounts (also referred to as a predetermined region of a shifted image) from the taken image taken at the time k−1. The control unit 201 further cuts out a predetermined region that is not shifted in position from the taken image taken at the time k. The control unit 201 forms a subtraction image based on a difference between the predetermined region cut out from the taken image taken at the time k and each of the predetermined regions cut out from the taken image taken at the time k−1 and calculates the sum of the pixel values of the binary-converted subtraction image. The control unit 201 identifies a shift amount that makes the sum of the pixel values the smallest among the sums of the pixel values of the binary-converted subtraction images. As described above, since the shift amount thus identified is associated with a corresponding movement amount when the vehicle moves in the horizontal direction, the control unit 201 can estimate the horizontal movement amount of the vehicle from the identified shift amount. For example, the control unit 201 consults a horizontal movement amount table prestored in the storage device 202 to retrieve the horizontal movement amount associated with the shift amount.

In S607, the control unit 201 determines whether the speed level of the vehicle or the horizontal movement amount of the vehicle satisfies a notification condition. The notification condition may include, for example, a condition where the horizontal movement amount per predetermined unit time is equal to or greater than a threshold, or the speed level of the vehicle is equal to or greater than a predetermined speed indicating an overspeed. For example, when the horizontal movement amount per predetermined unit time is equal to or greater than the threshold, the occupant can be notified that the vehicle has largely deflected. Further, when the speed level of the vehicle is equal to or greater than the speed indicating an overspeed, the occupant can be notified of the overspeed. A plurality of stepwise-different thresholds may be set for the speed indicating an overspeed, or alternatively, different notifications may be made stepwise in a manner that depends on the speed level.

The control unit 201 determines whether at least one of the notification conditions is satisfied based on the speed level estimated in S603 and the horizontal movement amount estimated in S606. When determining that at least one of the notification conditions is satisfied, the control unit 201 proceeds to S608, otherwise brings this series of operation steps to an end.

In S608, the control unit 201 makes notification via the output device 205 based on the notification condition thus determined. For example, the control unit 201 may output a voice (for example, "speed has exceeded XX km/s") corresponding to the notification condition determined to be satisfied in S606 or turn on an indicator. When determining that a plurality of notification conditions are satisfied, the control unit 201 may consult a priority table where priorities of the notification conditions are predefined and output notification corresponding to a notification condition having the highest priority (alternatively, some of the notification conditions having the highest priority). Upon completion of the output of the notification, the control unit 201 brings this series of operation steps to an end.

As described above, according to the present embodiment, in order to estimate the movement amount of the vehicle to which the dashcam 101 is attached, a first taken image taken of the exterior view seen from the vehicle at a first time and a second taken image taken at a second time earlier than the first time are used. The control unit 201 estimates the movement amount (speed level or horizontal movement amount) of the vehicle from the smallest difference among differences between image information on a predetermined region cut out from the first taken image and image information on a predetermined region of each image (a predetermined region of a manipulated image) obtained by manipulating the second taken image based on mutually different predicted movement amounts (for example, speed levels or horizontal movement amounts). Accordingly, the presence of a specific object (for example, a white line) on a road is not essential, so that the movement amount of the vehicle can be estimated even under a condition where the white line is not appropriately imaged, that is, under a redundant condition. Further, making the processing simple as described above allows an increase in throughput even with computational resources of a stand-alone dashcam.

Second Embodiment

Next, a second embodiment will be described. The above embodiment has been described based on the example where the imaging device 203 performs the processing using the image taken of the front view seen from the vehicle 100. However, when another vehicle is traveling ahead in a lane in which the vehicle 100 is traveling, the appropriate estimation of the speed level may fail due to scaling even though the vehicle area does not change as much as the back view. Notification to the occupant using an inaccurately estimated speed level may deteriorate the usability of the dashcam. Therefore, according to the present embodiment, the speed level is further estimated from the taken image taken of the back view and the taken image taken of each side view, and then the reliability of the speed level estimated from the taken image of the front view is determined. This allows, when the reliability of the estimated speed level is high, the speed level to be used for the notification processing. This increases the accuracy of notification to the occupant.

Note that the dashcam 101 according to the present embodiment may be the same in configuration as the dashcam according to the above embodiment, but the processing of estimating the movement amount is partly different. Therefore, the same configuration and processing are denoted by the same reference numerals, and with no description given of such configuration and processing, the following description mainly focuses on differences.

<Series of Operation Steps of Processing of Estimating Movement Amount>

Figure 7:
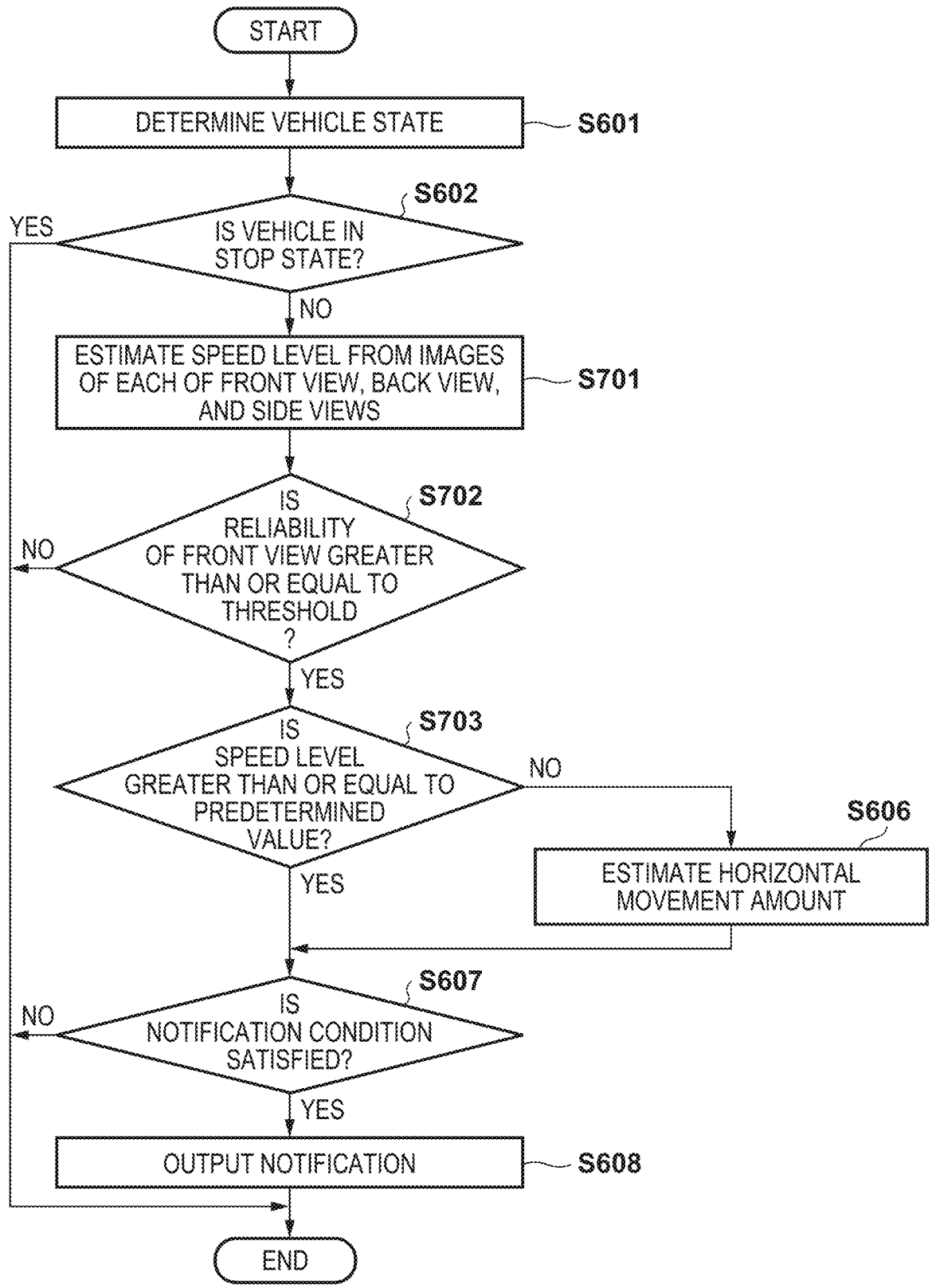
FIG. 7 is a flowchart illustrating a series of operation steps of processing of estimating a movement amount according to a second embodiment.

A series of operation steps of processing of estimating the movement amount performed by the dashcam 101 according to the present embodiment will be described with reference to FIG. 7. Note that, as in the first embodiment, this processing is implemented by, for example, a program stored in the storage device 202 that is executed by the control unit 201 of the dashcam 101.

The control unit 201 performs S601 and S602 in the same manner as in the first embodiment and subsequently estimates, in S701, the speed level from each of the taken images of the front, back, and side views. The front speed level is estimated in S603 described above.

Further, for the back view, the control unit 201 captures two taken images taken at the same time as the front view, i.e., a taken image taken at a certain time k and a taken image taken at a time (k−1) earlier than the time k. Note that when the dashcam 101 takes an image of the back exterior view seen from the vehicle, the interior and window regions fall within the image, so that the other regions (such as the interior and human regions) may be masked so as to make the image of the exterior view usable. For example, a region where variance of a change is lower than a predetermined value in the taken images sequentially taken over several seconds may be masked.

Also for the taken image of the back view, the control unit 201 scales the taken image taken at the time k−1 by stepwise-different scaling factors to form a plurality of scaled images and cuts out a predetermined region having the same center from each of the scaled images. The control unit 201 further cuts out a predetermined region having the same size from the taken image taken at the time k. The control unit 201 forms a subtraction image based on a difference between the predetermined region cut out from the taken image taken at the time k and each of the predetermined regions cut out from the scaled images and calculates the sum of the pixel values of the binary-converted subtraction image. The control unit 201 identifies a scaling factor that makes the sum of the pixel values the smallest among the sums of the pixel values of the binary-converted subtraction images. The scaling factor identified based on the back-view image is associated with a speed level when the vehicle moves forward or backward. Note that whether the image is scaled up or down is opposite to the scaling by the scaling factor identified based on the front-view image. This allows the control unit 201 to estimate the speed level of the vehicle from the scaling factor identified based on the back-view image. Note that, for the sake of convenience, the speed level estimated based on the back-view image is referred to as a back speed level. For example, the control unit 201 consults a back-view image speed level table prestored in the storage device 202 to retrieve the back speed level associated with the scaling factor.

Further, for the side views, the control unit 201 captures two taken images taken at the same time as the front view, i.e., a taken image taken at a certain time k and a taken image taken at a time (k−1) earlier than the time k. Note that when the dashcam 101 takes an image of each side exterior view seen from the vehicle, the interior and window regions fall within the image, so that the other regions may be masked so as to make the image of the exterior view usable. For example, a region where variance of a change is lower than a predetermined value in the taken images sequentially taken over several seconds may be masked.

In order to estimate the speed level of the vehicle from the taken image of each side view, the control unit 201 performs processing similar to the processing of estimating the horizontal movement amount. That is, the control unit 201 cuts out a predetermined region horizontally shifted by stepwise-different shift amounts from the taken image taken at the time k−1. The control unit 201 further cuts out a predetermined region that is not shifted in position from the taken image taken at the time k. The control unit 201 forms a subtraction image based on a difference between the predetermined region cut out from the taken image taken at the time k and each of the predetermined regions cut out from the taken image taken at the time k−1 and calculates the sum of the pixel values of the binary-converted subtraction image. The control unit 201 identifies a shift amount that makes the sum of the pixel values the smallest among the sums of the pixel values of the binary-converted subtraction images. The shift amount identified based on the side-view image is associated with the speed level of the vehicle. This allows the control unit 201 to estimate the speed level of the vehicle from the shift amount identified based on the side-view image. For the sake of convenience, the speed level estimated from the side-view image is referred to as a side speed level. The control unit 201 estimates right and left-side speed levels of the vehicle. The control unit 201, for example, consults a right and left side-view image speed level table prestored in the storage device 202 to retrieve the side speed level associated with the shift amount identified based on the side-view image.

In S702, the control unit 201 determines whether the reliability of the speed level estimated from the front-view image is equal to or greater than a threshold. For example, the control unit 201 takes a difference between the speed level estimated from the front-view image and another speed level, then calculates the sum of differences between two speed levels closest to each other (for example, the right-side speed level and the left-side speed level), and sets the sum thus calculated as the reliability of the front speed level. This allows, even when a speed level in one direction is an outlier (for example, the estimated back speed level is an outlier due to the presence of a following vehicle), the reliability of the front speed level to be calculated more reliably using the speed levels in the other directions, for example. When determining that the reliability of the front speed level is equal to or greater than the threshold, the control unit 201 proceeds to S703, otherwise (determines that the front speed level at the present moment cannot be used for notification), brings this series of processing to an end.

Note that, according to the present embodiment, the reliability of the front speed level is determined, but the speed based on which the reliability is determined may be a speed level estimated from a taken image taken in another direction. For example, when the intensity of the taken image taken of the front view is greater than a predetermined value (when the image of the front view is taken against light because the sun is located in front of the vehicle), the reliability of the speed level estimated from the taken image taken of the back view or the taken images taken of the side views may be determined, and the speed level may be used in the subsequent processing.

In S703, the control unit 201 determines whether the estimated front speed level is equal to or greater than the predetermined speed threshold. When determining that the front speed level is equal to or greater than the predetermined speed threshold, the control unit 201 proceeds to S607 without performing the processing of estimating the horizontal movement amount of the vehicle. On the other hand, when determining that the front speed level is less than the predetermined speed threshold, the control unit 201 proceeds to S606 to perform the processing of estimating the horizontal movement amount of the vehicle.

Subsequently, the control unit 201 performs S606 to S608 as in the first embodiment, and bring this series of operation steps to an end.

As described above, according to the present embodiment, four speed levels are separately estimated from the taken images taken of the front view, back view, and side views, and the reliability of the speed level in one direction is calculated based on the speed levels in the other directions. This allows the speed level to be calculated in a simple manner and can avoid the use of a speed level in a direction with lower reliability. Accordingly, when the reliability is high, the notification using the speed level can be made.

Third Embodiment

Next, a third embodiment will be described. According to the second embodiment, the speed level is first estimated from each of the taken images taken of the back view and side views, the reliability of the speed level estimated from the image taken of the front image is determined, and then a speed level with lower reliability is rejected. On the other hand, according to the third embodiment, object recognition processing of recognizing a vehicle in the image taken in each direction is performed, and the speed level is estimated based on a taken image in which no vehicle is recognized.

Note that the present embodiment is described based on an example where a vehicle is recognized in a taken image, but the object-to-be-recognized is not limited to a vehicle and may include other moving objects. Further, the dashcam 101 according to the present embodiment may be the same in configuration as the dashcam according to the above embodiments, but the processing of estimating the movement amount partly differs. Therefore, the same configuration and processing are denoted by the same reference numerals, and with no description given of such configuration and processing, the following description mainly focuses on differences.

<Series of Operation Steps of Processing of Estimating Movement Amount>

Figure 8:
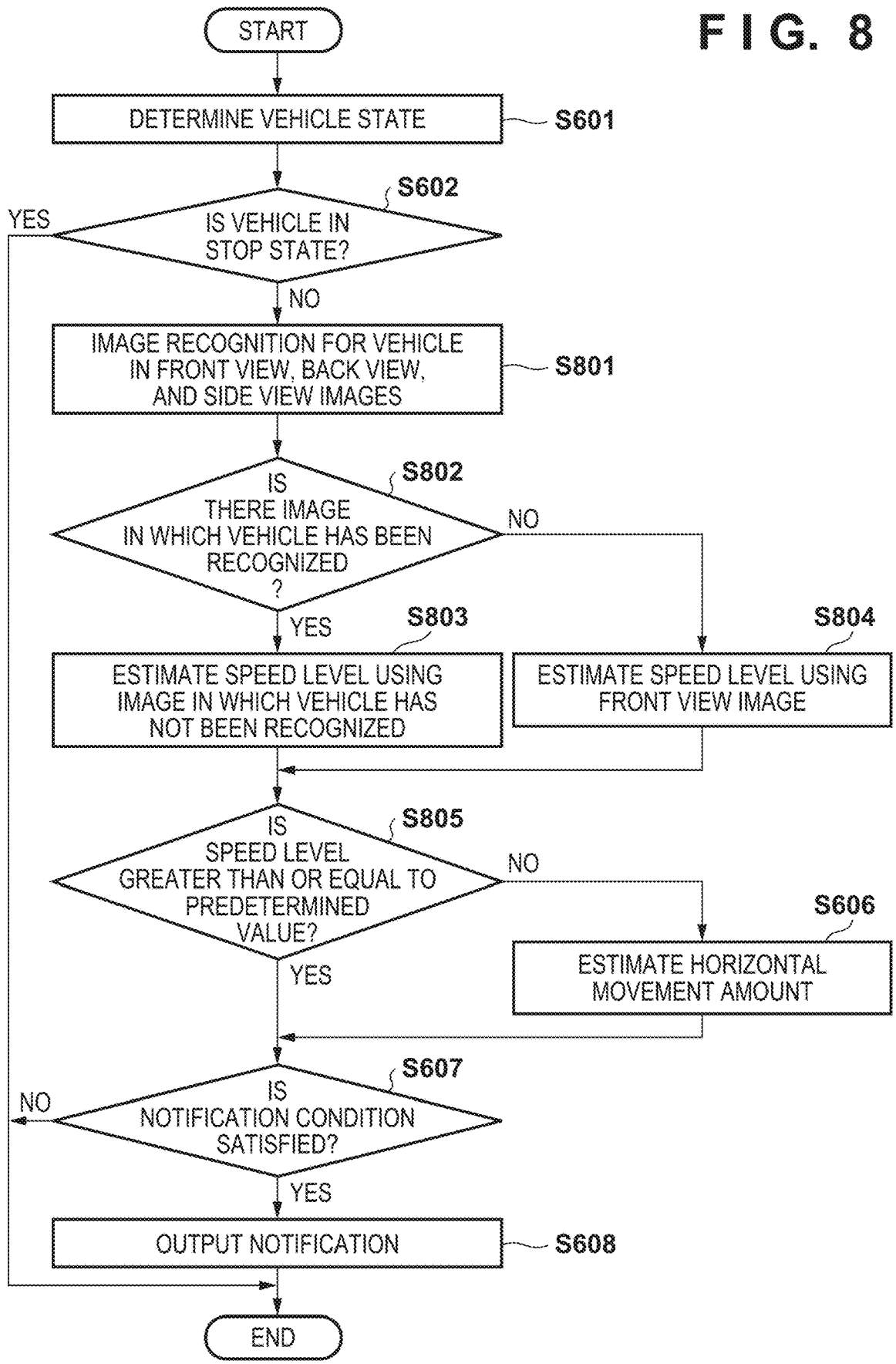
FIG. 8 is a flowchart illustrating a series of operation steps of processing of estimating a movement amount according to a third embodiment.

A series of operation steps of processing of estimating the movement amount performed by the dashcam 101 according to the present embodiment will be described with reference to FIG. 8. Note that, as in the above embodiments, this processing is implemented by, for example, a program stored in the storage device 202 that is executed by the control unit 201 of the dashcam 101.

The control unit 201 performs S601 and S602 in the same manner as in the first embodiment, and subsequently performs, in S801, known image recognition processing on the images taken of the front view, back view, and side views to detect a vehicle in each of the taken images. This processing is performed, for example, to eliminate the influence of other vehicles traveling in front of or behind the vehicle 100 and other vehicles traveling in parallel with the vehicle 100. For the recognition of a vehicle in each taken image, the direction of a vehicle in the image may be taken into consideration. For example, image recognition may be performed with consideration given to the rear of a vehicle in the taken image taken of the front view, the front of a vehicle in the taken image taken of the back view, the side of a vehicle in the taken images taken of the side views.

In S802, the control unit 201 determines whether there is an image in which a vehicle is recognized in S801. When no vehicle is recognized in any one of the images, the control unit 201 proceeds to S804. On the other hand, when a vehicle is recognized in any one of the images, the control unit 201 proceeds to proceeds to S803. The front speed level is estimated in S603 described above. Note that the control unit 201 may bring this series of operation steps to an end when vehicles are recognized in all the taken images.

In S803, the control unit 201 estimates the speed level from a taken image in which no vehicle is recognized among the front-view image, the back-view image, and the side-view images. How to estimate the speed level based on each image is the same as S701 described above.

In S804, the control unit 201 estimates the front speed level from the front-view image. How to estimate the front speed level is the same as S603 described above. Note that, during this processing, the front speed level is estimated as an example, but as in S702, the back speed level or the side speed level is further estimated, and then the reliability of the front speed level may be determined. In this case, when the reliability of the front speed level is low, this series of operation steps may be brought to an end.

In S805, the control unit 201 uses the speed level estimated in S803 or S804 to determine whether the speed level is equal to or greater than the predetermined speed threshold. When determining that the speed level thus estimated is equal to or greater than the predetermined speed threshold, the control unit 201 proceeds to S607 without performing the processing of estimating the horizontal movement amount of the vehicle. On the other hand, when determining that the estimated speed level is less than the predetermined speed threshold, the control unit 201 proceeds to S606 to perform the processing of estimating the horizontal movement amount of the vehicle.

Subsequently, the control unit 201 performs S606 to S608 as in the first embodiment, and bring this series of operation steps to an end.

As described above, according to the present embodiment, when the four speed levels are separately estimated from the images taken of the front view, back view, and side views, a taken image in which a vehicle is recognized by image recognition is not used for estimation of the speed level. This allows the speed level to be calculated in a simple manner and can reduce the possibility of a decrease in accuracy of the estimated speed level due to the influence of vehicles traveling in front, behind, and in parallel.

<Summary of Embodiments>

1. An information processing apparatus (e.g., 101) in the above embodiment is an information processing apparatus (e.g., 101) for estimating a movement amount of a moving object to which the information processing apparatus is attached, the information processing apparatus comprising:

an imaging unit (e.g., 203) configured to capture a taken image taken of an exterior view seen from the moving object; and an estimation unit (e.g., 201) configured to estimate the movement amount of the moving object based on a first taken image taken at a first time and a second taken image taken at a second time earlier than the first time, wherein the estimation unit estimates the movement amount of the moving object based on a difference between image information on a predetermined region of each manipulated image obtained by manipulating the second taken image based on mutually different predicted movement amounts and image information on a predetermined region cut out from the first taken image (e.g., S603, S606, S701, S803, and S804).

According to the embodiments, it is possible to estimate the behavior of a moving object in a simple and redundant manner. Further, making the processing simple allows an increase in throughput even with computational resources of a small device such as a stand-alone dashcam.

2. In the information processing apparatus in the above embodiment, the movement amount of the moving object is estimated based on the predicted movement amount corresponding to the manipulated image having the smallest difference.

According to the embodiments, it is possible to estimate the behavior of the moving object in a simple and redundant manner based on changes in an image.

3. In the information processing apparatus in the above embodiment, the predicted movement amount includes a horizontal movement amount of the moving object, and the estimation unit estimates a movement speed of the moving object based on a difference between image information on a predetermined region of each shifted image obtained by horizontally shifting the second taken image by different shift amounts and image information on a predetermined region cut out from the first taken image (e.g., S606).

According to the embodiments, it is possible to estimate the behavior of the moving object in the horizontal direction in a simple and redundant manner.

4. In the information processing apparatus in the above embodiment, the movement speed of the moving object is estimated based on the shift amount corresponding to the shifted image having the smallest difference.

According to the embodiments, it is possible to estimate the behavior of the moving object in the horizontal direction based on an image shift amount in a simple and redundant manner.

5. In the information processing apparatus in the above embodiment, the predicted movement amount includes a movement speed of the moving object moving forward or backward, and the estimation unit estimates the movement speed of the moving object based on a difference between image information on a predetermined region of each scaled image obtained by scaling the second taken image up or down by different scaling factors and image information on a predetermined region cut out from the first taken image (e.g., S603, S701, S803, S804).

According to the embodiments, it is possible to estimate the movement speeds of the moving object in the forward and backward directions in a simple and redundant manner.

6. In the information processing apparatus in the above embodiment, the movement speed of the moving object is estimated based on the scaling factor corresponding to the scaled image having the smallest difference.

According to the embodiments, it is possible to estimate the movement speeds of the moving object in the forward and backward directions based on an image scaling factor in a simple and redundant manner.

7. In the information processing apparatus in the above embodiment, the imaging unit is capable of capturing taken images taken of an exterior view seen from the moving object in a plurality of directions (e.g., 203), and the estimation unit estimates the movement speed of the moving object from the first taken image and the second taken image that are taken of a view in at least one of the plurality of directions (e.g., S603, S701).

According to the embodiments, even in a situation where an appropriate movement speed cannot be estimated from a taken image taken in one direction, it is possible to estimate the movement speeds of the moving object in the forward and backward directions from a taken image taken in another direction in a simple and redundant manner.

8. The information processing apparatus in the above embodiment, further comprises a determination unit (e.g., 201, S702) configured to determine reliability of the movement speed of the moving object estimated by the estimation unit, and the determination unit determines first reliability of the movement speed of the moving object estimated from the first taken image and the second taken image that are taken of a view in a first direction of the plurality of directions based on a plurality of movement speeds of the moving object estimated from the first taken image and the second taken image that are taken of a view in each of the plurality of other directions.

According to the embodiments, it is possible to determine whether the movement speed estimated from a taken image taken in one direction is reliable based on a taken image taken in another direction. This allows the speed level to be calculated in a simple manner and can avoid the use of an estimation result with lower reliability.

9. The information processing apparatus in the above embodiment, further comprises a recognition unit (e.g., 201, S801) configured to recognize a moving object appearing in a taken image, and the estimation unit estimates the movement speed of the moving object from the first taken image and the second taken image that are taken of a view in a direction corresponding to a taken image in which no moving object has been recognized by the recognition unit among the taken images taken of views in the plurality of directions (e.g., S803).

According to the embodiments, it is possible to calculate the speed level in a simple manner, and it is possible to reduce the possibility of a decrease in accuracy of the estimated speed level due to the influence of moving objects located in front, behind, and in parallel.

10. The information processing apparatus in the above embodiment, further comprises an output unit configured to output notification to an occupant in a manner that depends on the movement amount of the moving object estimated by the estimation unit.

According to the embodiments, it is possible to provide, to the occupant, a driver-assistance function that is performed in a manner that depends on the movement amount.

11. In the information processing apparatus in the above embodiment, the first taken image and the second taken image are taken images taken of a front view or back view seen from the moving object.

12. An information processing method in the above embodiment is an information processing method (e.g., FIG. 6) for estimating a movement amount of a moving object to which an information processing apparatus is attached, the information processing method comprising:

capturing a taken image taken of an exterior view seen from the moving object; and estimating the movement amount of the moving object based on a first taken image taken at a first time and a second taken image taken at a second time earlier than the first time, wherein the estimating includes estimating the movement amount of the moving object based on a difference between image information on a predetermined region of each manipulated image obtained by manipulating the second taken image based on mutually different predicted movement amounts and image information on a predetermined region cut out from the first taken image.

According to the embodiments, it is possible to estimate the behavior of a moving object in a simple and redundant manner.

The invention is not limited to the foregoing embodiments, and various variations/changes are possible within the spirit of the invention.

What is claimed is:

1. An information processing apparatus for estimating a movement amount of a moving object to which the information processing apparatus is attached, the information processing apparatus comprising:
    one or more processors; and
    a memory storing instructions executed by the one or more processors, instructions being for:
    capturing a taken image taken of an exterior view seen from the moving object; and
    estimating the movement amount of the moving object based on a first taken image taken at a first time and a second taken image taken at a second time earlier than the first time, wherein
    the estimating the movement amount of the moving object includes generating transformed images by transforming the second taken image using different transforming parameters each of which corresponds to each of different movement amounts of the moving object, and estimating the movement amount of the moving object based on a difference between image information on a predetermined region of each of the transformed images and image information on a predetermined region cut out from the first taken image.

2. The information processing apparatus according to claim 1, wherein the movement amount of the moving object is estimated based on a movement amount corresponding to one of the transformed images having the smallest difference between image information on the predetermined region of each of the transformed images and image information on the predetermined region cut out from the first taken image.

3. The information processing apparatus according to claim 1, wherein
    the movement amount includes a movement speed of the moving object moving forward or backward, and
    the estimating the movement amount of the moving object includes estimating the movement speed of the moving object based on a difference between image information on a predetermined region of each scaled image obtained by scaling the second taken image up or down by different scaling factors and image information on a predetermined region cut out from the first taken image.

4. The information processing apparatus according to claim 3, wherein the movement speed of the moving object is estimated based on the scaling factor corresponding to the scaled image having the smallest difference.

5. The information processing apparatus according to claim 3, wherein
    the instructions for capturing taken images further includes capturing taken images taken of an exterior view seen from the moving object in a plurality of directions, and
    the instructions for estimating the movement amount of the moving object includes estimating the movement speed of the moving object from the first taken image and the second taken image that are taken of a view in at least one of the plurality of directions.

6. The information processing apparatus according to claim 5, the instructions further comprising instructions for determining reliability of the movement speed of the moving object estimated, wherein
    the determining the reliability includes determining first reliability of the movement speed of the moving object estimated from the first taken image and the second taken image that are taken of a view in a first direction of the plurality of directions based on a plurality of movement speeds of the moving object estimated from the first taken image and the second taken image that are taken of a view in each of the plurality of other directions.

7. The information processing apparatus according to claim 5, the instructions further comprising instructions for recognizing a moving object appearing in a taken image, wherein
    the instructions for estimating the movement amount of the moving object includes estimating the movement speed of the moving object from the first taken image and the second taken image that are taken of a view in a direction corresponding to a taken image in which no moving object has been recognized among the taken images taken of views in the plurality of directions.

8. The information processing apparatus according to claim 1, the instructions further comprising instructions for outputting notification to an occupant in a manner that depends on the movement amount of the moving object estimated.

9. An information processing apparatus for estimating a movement amount of a moving object to which the information processing apparatus is attached, the information processing apparatus comprising:
    one or more processors; and
    a memory storing instructions executed by the one or more processors, the instructions being for:
    capturing a taken image taken of an exterior view seen from the moving object; and
    estimating the movement amount of the moving object based on a first taken image taken at a first time and a second taken image taken at a second time earlier than the first time wherein
    the estimating the movement amount of the moving object includes estimating the movement amount of the moving object based on a difference between image information on a predetermined region of each transformed image obtained by transforming the second taken image based on different predicted movement amounts and image information on a predetermined region cut out from the first taken image,
    the movement amount includes a horizontal movement amount of the moving object, and
    the estimating the movement amount of the moving object includes estimating a movement speed of the moving object based on a difference between image information on a predetermined region of each shifted image obtained by horizontally shifting the second taken image by different shift amounts and image information on a predetermined region cut out from the first taken image.

10. The information processing apparatus according to claim 9, wherein the movement speed of the moving object is estimated based on the shift amount corresponding to the shifted image having the smallest difference.

11. The information processing apparatus according to claim 9, wherein the first taken image and the second taken image are taken images taken of a front view or back view seen from the moving object.

12. An information processing method for estimating a movement amount of a moving object to which an information processing apparatus is attached, the information processing method comprising:
- capturing a taken image taken of an exterior view seen from the moving object; and
- estimating the movement amount of the moving object based on a first taken image taken at a first time and a second taken image taken at a second time earlier than the first time, wherein
  the estimating the movement amount of the moving object includes
  - generating transformed images by transforming the second taken image using different transforming parameters each of which corresponds to each of different movement amounts of the moving object, and
  - estimating the movement amount of the moving object based on a difference between image information on a predetermined region of each of the transformed images and image information on a predetermined region cut out from the first taken image.

13. A moving object system comprising a moving object and an information processing apparatus, the information processing apparatus being an apparatus for estimating a movement amount of a moving object to which the information processing apparatus is attached, and the information processing apparatus comprising one or more processors and a memory storing instructions executed by the one or more processors, the instructions being for:
- capturing a taken image taken of an exterior view seen from the moving object; and
- estimating the movement amount of the moving object based on a first taken image taken at a first time and a second taken image taken at a second time earlier than the first time, wherein
  the estimating the movement amount of the moving object includes
  - generating transformed images by transforming the second taken image using different transforming parameters each of which corresponds to each of different movement amounts of the moving object, and
  - estimating the movement amount of the moving object based on a difference between image information on a predetermined region of each of the transformed images and image information on a predetermined region cut out from the first taken image.

* * * * *